(12) United States Patent
Pagenkopf

(10) Patent No.: US 8,975,782 B2
(45) Date of Patent: Mar. 10, 2015

(54) REVERSE POWER Y-ADAPTER

(75) Inventor: Kenneth E. Pagenkopf, Shorewood, WI (US)

(73) Assignee: Power Products, LLC, Menomonee Falls, WI (US)

(*) Notice: Subject to any disclaimer, the term of this patent is extended or adjusted under 35 U.S.C. 154(b) by 562 days.

(21) Appl. No.: 13/360,115

(22) Filed: Jan. 27, 2012

(65) Prior Publication Data

US 2012/0194163 A1    Aug. 2, 2012

Related U.S. Application Data

(60) Provisional application No. 61/437,473, filed on Jan. 28, 2011.

(51) Int. Cl.
*H02J 3/00* (2006.01)
*B60R 16/02* (2006.01)

(52) U.S. Cl.
CPC ..................................... *B60R 16/02* (2013.01)
USPC ............................................ 307/71; 307/85

(58) Field of Classification Search
CPC ..... B60R 16/0207; B60R 16/02; H02H 11/00
USPC .......................................................... 307/71, 85
See application file for complete search history.

(56) References Cited

U.S. PATENT DOCUMENTS

| 5,160,852 | A   | 11/1992 | Charles et al. |
| 5,245,219 | A   | 9/1993  | Romatzick, Jr. et al. |
| 5,302,857 | A   | 4/1994  | Charles et al. |
| 6,965,818 | B2* | 11/2005 | Koenig et al. .................. 701/36 |

* cited by examiner

*Primary Examiner* — Jared Fureman
*Assistant Examiner* — Brett Squires
(74) *Attorney, Agent, or Firm* — Michael Best & Friedrich LLP

(57) ABSTRACT

A power Y-adapter provides power at a high voltage to an output end from at least two input ends to which power of a lower voltage and a phase difference is provided and includes a first polarity sensitive current isolation device, a second polarity sensitive current isolation device, a control section, and an output section. When the voltage signals supplied to the hot wire terminals of the first input connector and the second input connector sufficiently are out of phase, the Y-adapter can produce a voltage of higher magnitude between the first and the second hot wire terminals of the output connector.

12 Claims, 5 Drawing Sheets

REVERSE POWER Y-ADAPTER

CROSS-REFERENCE TO RELATED APPLICATIONS

This claims the benefit of U.S. Provisional Patent Application No. 61/437,473 filed Jan. 28, 2011, the disclosure of which is hereby incorporated by reference for all purposes.

FIELD OF THE INVENTION

This invention relates to a power adapter, more particularly an adapter unit for supplying electrical power to a marine vessel from a dockside power center.

BACKGROUND OF THE INVENTION

Power adapters are commonly used for mobile vehicles which are equipped with significant electrical and electronic equipment. A typical example is a boat or recreational vehicle which can be equipped with navigational equipment such as radio and radar, kitchen appliances such as a cooking range and refrigerator, entertainment equipment such as television and stereo, and other such electrical and electronic equipment. When a boat is moored at a dock or the like, electrical power is commonly supplied from a shore or dockside power center, such as a dockside electrical pedestal at the marina, which includes at least two electrical receptacles into which cables from the vessel can be inserted. Such a power center commonly has two or more identical receptacles each supplying 120 volts AC. If all of the equipment aboard the vessel is designed to operate at the same voltage, there is no problem. However, if the craft has 240 volt (or 208 volt) equipment, or if the power distribution system on the craft is a 240 distribution system, the operator of the craft can not simply connect a docking power connector on the craft to the pedestal. For example, equipment such as blower motors, pumps or the like are wired for 208-240 volt power, that equipment may either not operate at all or operate at a low speed and overheat because of improper voltage.

Marinas usually provide separate 120 volt outlets on the pedestal wired from two phases of a two or three phase supply so that appropriate voltages are available for powering the equipment on a craft which requires a 240 volt supply. However, those two or three out-of-phase sources must be connected together in an appropriate manner before they are useful for powering the 240 volt equipment on the craft. Typically, the pedestal simply has the out-of-phase 120 volt sources brought out to separate receptacles, so that they can be used in the ordinary way for powering 120 volt equipment. It is common for a boat owner to make or buy a "Y" adapter with two male plugs at one end to make 120 volt input connections and a single 125/250 volt output connector having female contacts. The 125 volt input connectors are then inserted into the two receptacles on the pedestal and the single 125/250 volt output connector is plugged into the marine vessel ship-to-shore cable set as an input to the receptacle on the vessel. The electrical wiring for the vessel is connected to this receptacle.

Although a Y-adapter can theoretically provide a desired voltage of 120V or 208-240V and current to a vessel from a receptacle, there are a few practical problems with using the Y-adapter in various situations, such as improper connection of the Y-adapter to the power source, potential problems with the wiring of the pedestal power source, problems with the phase of the power supplied to the pedestal, and the like.

As an example of an improper connection of the Y-adapter, when one of the input connectors is inserted into a live socket in the pedestal, live voltage can also appear on the other input connector if precautions are not taken. If the user has his body in contact with the electrical prongs of an unconnected input connector, (s)he is subjected to the danger of receiving an electrical shock.

As another example of potential problems with the pedestal power source, if the electrical sources from the two selected receptacles are not from different phases, or not of a sufficient difference, the output voltage will not be adequate to drive the equipment on the craft. As another example, although with the proper phase difference, additional problems can result if one of the voltage sources is wired with its polarity reversed.

Further, overcurrent and overtemperature situations can also cause serious problems. For example, as the adapter plugs into a 50 A rated receptacle, it is a common misconception that the reverse Y-adapter is rated for 50 A. Although it may operate indefinitely at 50 A, circuit runs, wires and connectors that are rated at 30 A may overheat and have a shortened life.

Although some available technology can fix some of the problems, there are still some problems. For example, it is common in currently available circuit designs for a Y-adapter to place at least one circuit element across the hot terminal of two input connectors or plugs. In this design, a single component fault can cause a shock condition. As another example, some currently available designs have a tendency to buzz at low input voltage conditions and may cause the circuit to chatter or produce intermittent output. Still other problems include a bulky size or a tendency to fail at prolonged relatively high current conditions.

SUMMARY OF THE INVENTION

The present invention provides a Y-adapter configured to provide a reliable connection of an electrical load of one electrical characteristic to a pair of electrical sources of a different characteristic.

The power Y-adapter for providing power at a high voltage to an output end from at least two input ends to which power of a lower voltage and a phase difference is provided, includes a first polarity sensitive current isolation device, a second polarity sensitive current isolation device, a control section, and an output section.

The first polarity sensitive current isolation device is associated with a first input connector which is adapted to be connected to a first receptacle of a first voltage and phase. Further, the first polarity sensitive current isolation device has a first input terminal and a second input terminal. The first input terminal is connected to a hot wire terminal of the first input connector and the negative input terminal being connected to a neutral terminal of the first input connector. The second polarity sensitive current isolation device is associated with a second input connector which is adapted to be connected to a second receptacle of substantially the same voltage as the first receptacle and at a different phase than the first receptacle. The second polarity sensitive current isolation device has a first input terminal and a second input terminal. The first input terminal is connected to a neutral terminal at the second input connector and the second input terminal is connected to a hot wire terminal at the second input connector. Each of the first and the second polarity sensitive current isolation devices have a first output node and a second output node in series. The control section is in series with the output nodes of the first and the second polarity sensitive current isolation devices. The output section has an output connector with a first hot wire terminal and a second hot wire terminal controlled by the control section. When the voltage signals supplied to the hot wire terminals of the first input connector and the second input connector are out of phase, the Y-adapter can produce a voltage of higher magnitude between the first and the second hot wire terminals of the output connector.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
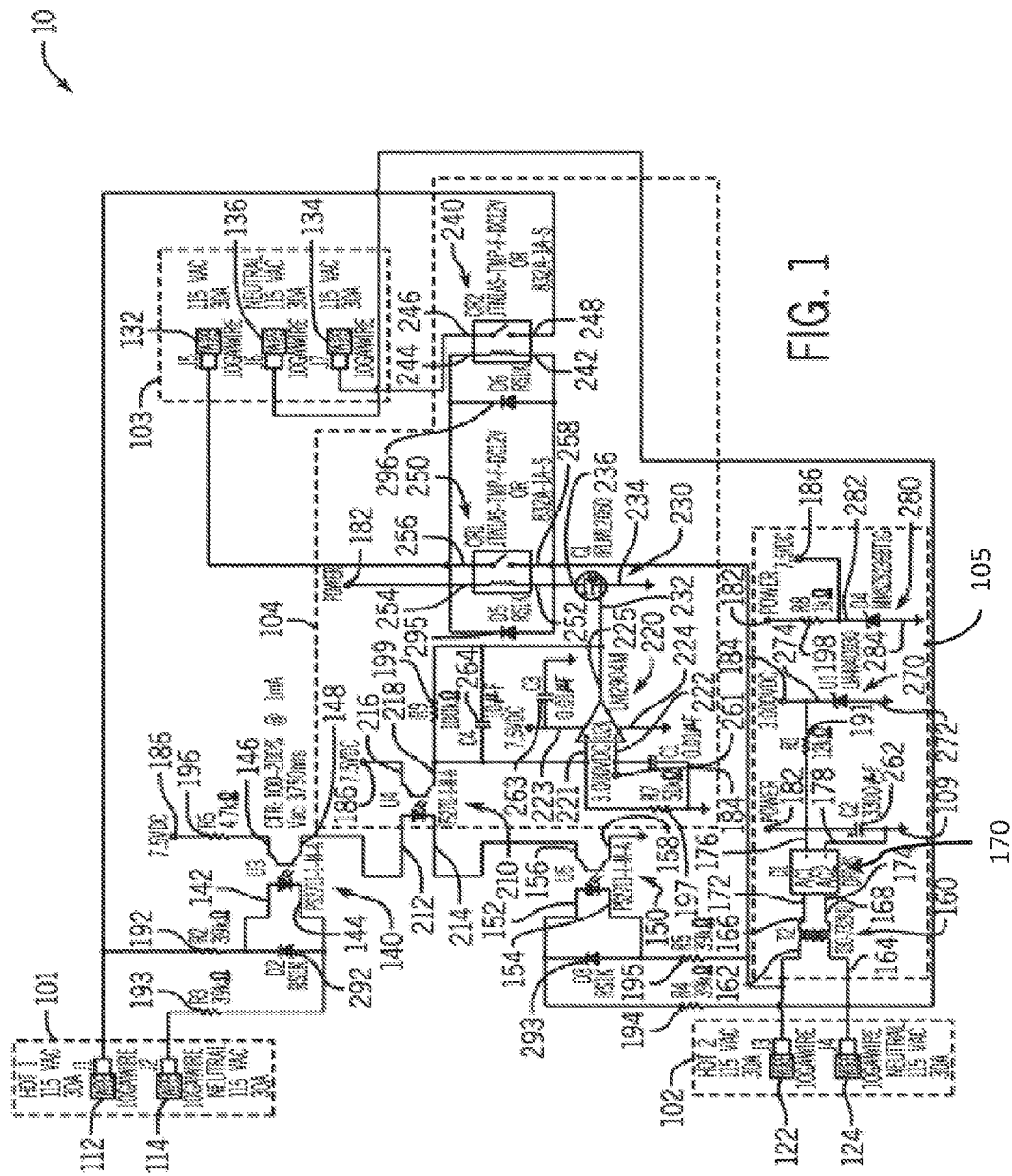
FIG. 1 is a circuit diagram showing a first embodiment of a Y-adapter that is configured to supply electrical power from a pair of power sources to a single receptacle, in accordance with the present invention.

FIG. 1 is a circuit diagram showing one embodiment of a Y-adapter 10 that is configured to supply electrical power from a pair of power sources to a single receptacle. The Y-adapter 10 includes a first input connector 101, a second input connector 102, an output connector 103, a control section 104, a power supply unit 105, a first polarity sensitive current isolation device 140, and a second polarity sensitive current isolation device 150.

More specifically, as shown in FIG. 1, the first input connector 101 includes a hot wire terminal 112 and a neutral terminal 114, and the second connector 102 includes a hot wire terminal 122 and a neutral terminal 124. The output connector 103 includes a first hot wire terminal 134, a second hot wire terminal 132, and a neutral terminal 136. The hot wire terminal 112 of the first connector 101 is connected to the first hot terminal 134 of the output connector through the first polarity sensitive current isolation device 140 and the control section 104. The hot wire terminal 122 of the second connector 102 is connected to the second terminal 132 of the output connector 103 through the second polarity sensitive current isolation device and the control section 104.

The first polarity sensitive current isolation device 140, such as an optocoupler, opto-isolator, photocoupler, or optical isolator, has a first input terminal 142, a second input terminal 144, a first output terminal 146, and a second output terminal 148. The first input terminal 142 of the first polarity sensitive current isolation device 140 is connected to the hot wire terminal 112 of the first input connector 101 through a second resistor 192. The second input terminal 144 of the first polarity sensitive current isolation device 140 is connected to the neutral terminal 114 of the first connector 101 through a third resistor 193. A second rectifier 292, such as a diode, is connected to the first polarity sensitive current isolation device 140 with a positive terminal connected to the first input terminal 142 and a negative terminal connected to the second input terminal 144.

The second polarity sensitive current isolation 150, such as an optocoupler, opto-isolator, photocoupler, or optical isolator, has a first input terminal 152, a second input terminal 154, a first output terminal 156, a second output terminal 158. The first input terminal 152 of the second polarity sensitive current isolation device 150 is connected to the neutral terminal 124 of the second input terminal 102 through a fourth resistor 194. The second input terminal 154 of the second polarity sensitive device is connected to the hot wire terminal 124 of the second connector 102 through a fifth resistor 195. A third rectifier 293, such as a diode, is connected to the second polarity sensitive current isolation device 150 with a positive terminal connected to the second input terminal 154 and a negative terminal connected to the first input terminal 152.

The power supply unit 105 includes a transformer 160, a bridge rectifier 170, a power output 182, a first voltage output 184, and a second voltage output 186. The transformer 160 has a first input terminal 162 and a second input terminal 164 connected to the hot wire terminal 122 and the neutral terminal 124 of the first input connector, respectively. A first output terminal 166 and a second output terminal 168 of the transformer are connected to a first input terminal 172 and a second input terminal 174 of the bridge rectifier 170. A positive output terminal 176 of the bridge rectifier is connected to the power output 182, and a negative output terminal 178 of the bridge rectifier is connected to a ground 109. The first voltage output 184 is connected to the positive output terminal 176 of the bridge rectifier 170 through a first resistor 191. The second voltage output 186 is connected to the positive output terminal of the bridge rectifier through a resistor 198. The power output 182 is connected to the ground 109 through a capacitor 262. The first voltage output 184 is connected to a cathode node 274 of a first voltage reference zener diode 270. An anode node 272 of the first voltage reference zener diode 270 is connected to the ground 109. The second voltage output is connected to a cathode node 282 of a zener diode 280. An anode node 284 of the zener diode 280 is connected to the ground 109.

The control section 104 essentially includes a third polarity sensitive current isolation device 210, a comparator 220, a transistor 230, a first relay 240, and a second relay 250. The third polarity sensitive current isolation device 210 is series connected with the first polarity sensitive current isolation device 140 and the second polarity sensitive current isolation device 150. A first input terminal 212 of the third polarity sensitive current isolation device 210 is connected to the second output terminal 148 of the first polarity sensitive current isolation device 140. A second input terminal 214 connected to the first input terminal 156 of the second polarity sensitive current isolation device 150; a first output terminal 216 of the third polarity sensitive current isolation device 210 is connected to the second voltage output 186. The comparator 220 having a non-inverting input terminal 221 connected to the second output terminal 218 of the third polarity sensitive current isolation device 210, an inverting input terminal 222 connected to the ground 109 through a capacitor and to the power supply output 184, a positive power supply terminal 223 connected to the second voltage output 186 of the power supply unit 105, a negative power supply 224 connected to the ground 109, and an output terminal 225 connected to the second output terminal 218 of the third polarity sensitive current isolation device 210 through a ninth resistor 199 and a capacitor. The transistor 230 has a gate terminal 232 connected to the output terminal 225 of the comparator 220, a source terminal 234 is connected to the ground 109, and a drain terminal 236.

A first terminal 242 of the first relay 240 and a first terminal 252 of the second relay 250 are connected to the drain terminal 236 of the transistor 230. A second terminal 244 of the first relay 240 and the second terminal 254 of the second relay 250 are connected to the power output 182 of the power supply unit 105, the third terminal 246 of the first relay 240 is connected to the first hot wire terminal 134 of the output connector 103, the third terminal 256 of the second relay 250 is connected to the second hot wire terminal 132 of the output connector 103, the fourth terminal 248 of the first relay 240 is connected to the hot wire terminal 112 of the first input connector 101, and the fourth terminal 258 of the second relay 250 is connected to the hot wire terminal 122 of the second input connector 102. A neutral terminal 136 of the output connector 103 is connected to the neutral terminal 124 of the second input connector 102.

In FIG. 1, the reverse Y-adapter 10 is configured to connect two 30 A, 125V receptacles through the first connector 101 and the second connector 102 to provide an equivalent to 50 A, 125V/250V shore power through the output connector 103. The combined power supplied has two phases of 120V with a voltage of 208-240V between them. The supply current is limited to 30 A as the reverse Y-adapter will not boost current to 50 A.

The reverse Y-adapter 10 uses the first polarity sensitive current isolation device 101 and the second polarity sensitive current isolation device 102 to isolate and sense the incoming voltage levels and phase. It then provides a filtered voltage level to the comparator 220, which determines if conditions are correct for turn-on. Adding delay and hysteresis, the comparator 220 drives the transistor 230 which then turns on both the first relay 240 and the second relay 250 simultaneously.

More particularly, the second resistor 192 and third resistor 193 limit the incoming 120V AC current to approximately 1 mA for the first polarity sensitive current isolation device 101. The second rectifier 292 works as a reverse bias protector for the first polarity sensitive current isolation device 101. Similarly, the fourth resistor 194 and the fifth resistor 195 limit the incoming 120V AC current for the second polarity sensitive current isolation device 102. The second rectifier 293 works as a reverse bias protector for the second polarity sensitive current isolation device 102. The first isolation device 101 and the second isolation 102 provide substantial isolation between the input voltage and sensing circuitry as well as complete isolation of the hot wire terminal 112 of the first connector 101 and the hot wire terminal 122 of the second connector 102.

The power supply unit 105 for the circuit is a traditional full wave bridge providing two regulated and one unregulated voltages, a first voltage, for example 3.0V, through the first voltage output 184 and a second voltage, for example 7.5V, through the second voltage output 186 and a third voltage, for example 12V. The first voltage is used as a voltage reference for the comparator 220, the second voltage is used to power everything except for the first relay 240 and the second relay 250, and the third voltage powers the relays 240 and 250.

The first isolation device 140, the second isolation 150, and the third isolation device 160 work as part of the circuit that is configured to make the phase decisions. In general, when positive voltage is supplied to the isolation device between the positive input terminal and the negative input terminal, the isolation device is in a connected state; otherwise the isolation device is in an isolated state. More particularly, by the first isolation device 140 and the second isolation device 150 unidirectionally, relative phase information is preserved. The first isolation device 140 and the third isolation device 160 are both in a connected state during a positive cycle of a first input AC signal from the first connector 101 and in an isolated state during a negative cycle. Further, since the second isolation device 150 is phase reverse connected, where the positive input terminal 152 is connected to the neutral terminal 124 and the negative input terminal 154 is connected to the hot wire terminal 122, the second isolation 150 is in a connected state during a negative cycle of a second input AC signal from the second connector 102.

Further the third isolation device 210 also works as a power source which drives the control section 104. When the third isolation device 210 is in a connected state, the current through it drives the control section. When the third isolation device is in an isolated state, the control section 104 is turned off and the first isolation device 140 and the second isolation device 150 are isolated from each other, which results in the first connector 101 and the second connector 102 being isolated from the output connector 103.

In the case of the first input AC signal from the first connector 101 and the second input AC signal from the second connector 102 having the same phase, due to the phase reversed connection of the second isolation device 150, the first isolation device 140 and the second isolation device 150 are never simultaneously in the connected state. Since the first isolation device 140, the second isolation device 150 are connected in series, the third isolation device 210 is provided no input current in this situation. Therefore, in this case, the first connector 101 and the second connector 102 are isolated from each other, and are also isolated from the output connector 103.

In the case of one of the connectors not being connected or plugged with a power source, the first input AC or the second input AC signal is missing or both are missing, the corresponding isolation device turns out to be in the isolated state. Therefore the third isolation device can not get input current. Therefore, in this case, the first connector 101 and the second connector 102 are isolated from each other, and also isolated from the output connector 103.

In the case of the first input AC signal from the first connector 101 and the second input AC signal from the second connector 102 being 180 degrees out of phase, the first isolation device 140 and the second isolation device 150 are in a connected state simultaneously every positive cycle of the first input AC signal, and the third isolation device can get an input current with an approximate 50% duty cycle. Therefore, in this case, the third isolation device 210 drives the control section 104.

In the case of the first input AC signal from the first connector 101 and the second input AC signal from the second connector 102 being 120 degrees out of phase, the first isolation device 140 and the second isolation device 150 are in a connected state together only part of the positive cycle of the first input AC signal. Therefore the third isolation device 210 can get an approximate 33% duty cycle to drive the control section 104.

In the case of the first input AC signal from the first connector 101 and the second input AC signal from the second connector 102 being 60 degrees out of phase, the third isolation device 210 is energized with an approximate 16% duty cycle to drive the control section.

When the third isolation device 210 is in a connected state, the current going through the third isolation device 210 can supply current to the seventh resistor 197 and voltage to the non-inverting input terminal 221 of the comparator 220. The comparator 220 compares the voltage at its non-inverting input terminal 221 to the reference voltage provided by the first voltage output 184 on its inverting input terminal 222. If the voltage at its non-inverting input terminal 221 is greater than the reference voltage, the output terminal 225 outputs a voltage signal. Otherwise, the output state terminal 225 stays low. Further, the fourth capacitor 264 and the ninth resistor 194 provide filtering, delay and hysteresis. The fourth capacitor 264 reduces the ripple from the duty cycle of the third isolation device 210 current and provides an approximate 100 ms delay by its charging time.

When the output voltage between the first output terminal 216 and the second output terminal 218 of the third isolation device 210 goes high, the fourth capacitor can send a charge back into the seventh resistor and hold the input high momentarily, thus preventing chatter. The ninth resistor 199 provides actual hysteresis by providing high state voltage back to the non-inverting input terminal 221 of the comparator 220. This makes the voltage of the non-inverting input terminal 221 harder to get below the threshold, for example 3V, in the high state than in the output terminal 225 low state, therefore the output terminal 225 can stay high even as the voltage of the seventh resistor 197 varies around the threshold level. The first capacitor 261 and the third capacitor 263 are noise bypass capacitors.

The transistor 230 is driven by the output terminal 225 of the comparator 220 and is in a conducting state when the voltage at the gate terminal 232 is in a high state. When in the conducting state, the first relay 240 and the second relay 250 are energized which turn on the connection between the hot wire terminal 112 of the first connector 101 with the first hot wire terminal 134 of the output connector 102 and the connection between the hot wire terminal 122 of the second connector 102 and the second hot wire terminal 132 of the output connector 102. As a supplement to the transistor 236, the diode 295 and the diode 296, which are snubber diodes, can suppress the spikes created when the relays turn off.

Further, the reverse Y-adapter has circuitry to determine if the two 30 A shore power sources have adequate voltage and correct phasing to provide 208-240 VAC to the connected boat or other load. Each of the two power sources are independently monitored and no electrical device such as a circuit including a capacitor, or another circuit element that is subject to being shorted in the case of a fire or overheating, is connected between the two supplies. Because of this, no leakage current can be measured between the sources and thus, there is no hazard of electrical shock when one source is plugged in and the other is not (independent of whether the boat is plugged in). The independence causes some operational abnormalities, which are described in the following table along with normal conditions.

| Supply Voltage Condition | Phasing source 1 | source 2 | Result | Output Voltage | Light State |
|---|---|---|---|---|---|
| normal 240 V | 0 deg | 180 deg | Turn-on | 240 V | On |
| normal 208 V | 0 deg | 120 deg | Turn-on | 208 V | On |
| normal 120 V | 0 deg | 0 deg | Stay off | na | Off |
| 1 plug disconnected | any | any | Stay off | na | Off |
| 1 phase reversed 120 V | 0 deg | 180 deg | Turn-on | 0 V | Off |
| 1 phase reversed 240 V | 0 deg | 0 deg | Stay off | na | Off |
| 1 phase reversed 208 V | 0 deg | 60 deg | Turn-on | 120 V | On |
|  |  |  | Stay off | na | Off |
| Voltage under 90 V | any | any | Cycle | <180 V | On/Off |
|  |  |  | Turn-on* | <90 V | Off |
|  |  |  | Turn-on | <180 V | On |
| Temperature above 100 C. | any | any | Cycle | na | On/Off |
| Load over 30A | any | any | Cycle | na | On/Off |

*only 1-phase will be connected

The operation abnormalities described above with respect to the phase reversed conditions help diagnose the existence of these conditions.

Figure 2:
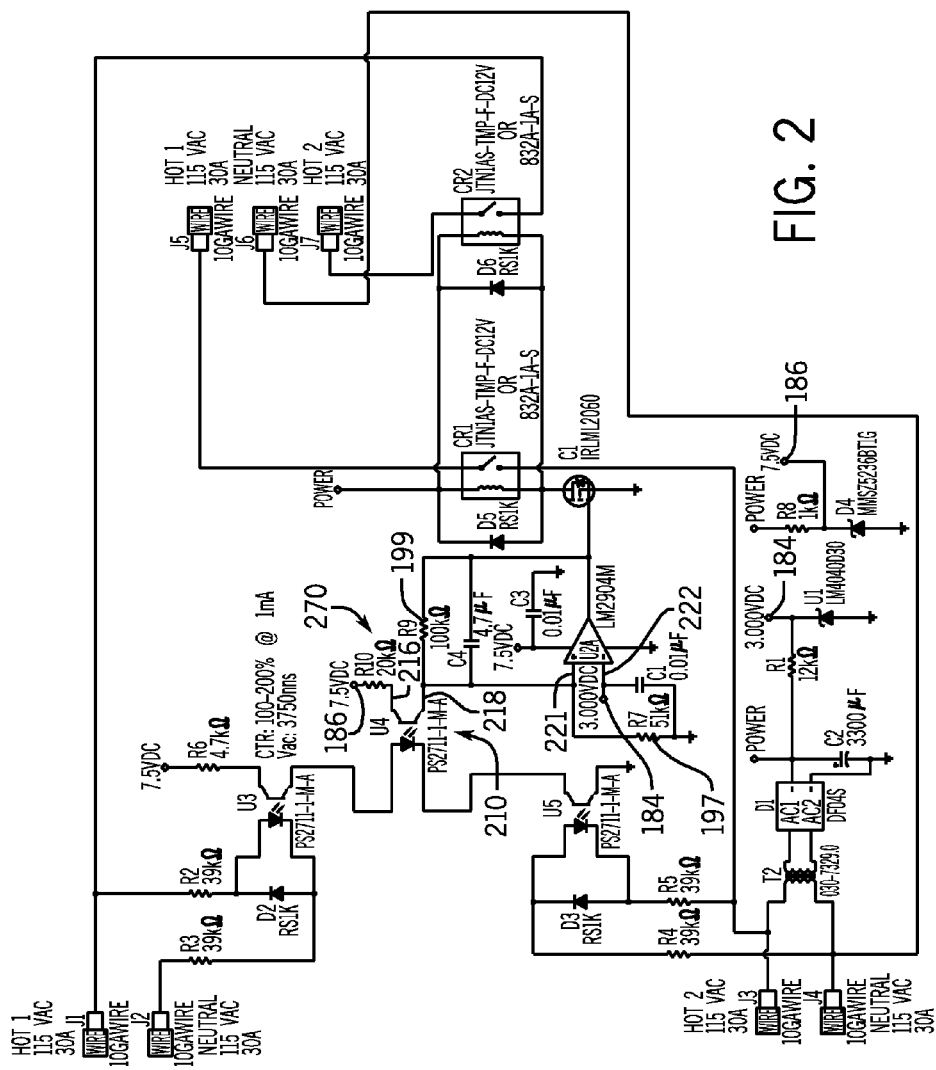
FIG. 2 is a diagram showing another embodiment of a Y-adapter that is configured to supply electrical power from a pair of power sources to a single receptacle, in accordance with the present invention.

FIG. 2 is a diagram showing another embodiment of the Y-adapter 20 that is configured to safely supply an electrical power from a pair of power sources, in accordance with the present invention. The overall structure, functions and operations of the Y-adapter 20 in FIG. 2 are essentially the same as those in FIG. 1, and a description thereof of similar components and function will be omitted.

The difference between the Y-adapter 11 shown in FIG. 1 and the Y-adapter in FIG. 2 lies in a resistor 270 is added in the Y-adapter 20 between the first output terminal 216 of the third isolation device 210.

As shown in FIG. 2, when the third isolation device 210 is in a connected state, an associated voltage can be developed by the seventh resistor 197 and the ninth resistor 199 and the tenth resistor 270. In this embodiment, the voltage of the non-inverting terminal 221 can be configured by using a particular resistance value to the seventh resistor 197, the ninth resistor 199, and the tenth resistor 270 to discriminate input AC signal with an improper phase relation, such as 60 degree out of phase.

For example, the first voltage provided by the first voltage output 184 is 3.0V, the second voltage provided by the second voltage output 186 is 7.5V, the resistance value of the ninth resistor 199 is 100 kΩ, the resistance value of the seventh resistor 197 is 51 kΩ, and the resistance value of the tenth resistor 270 is 20 kΩ. When the first AC input signal and the second AC input signal are 180 degree out of phase, the voltage of the non-inverting terminal 221 of the comparator is 4.4V, which is greater than the voltage of the inverting input terminal 222 of the comparator 220, 3.0V. Therefore the comparator is turned on and outputs a voltage signal, which turns on the connection between the input connectors and the output connector through the transistor and the relays. Similarly, when they are 120 degree out of phase, the voltage of the non-inverting terminal 221 of the comparator is 3.6V, which is greater than 3.0V, therefore the connections between the input connectors and the output connectors are turned on. However, when they are 60 degrees out of phase, the voltage of the non-inverting terminal 221 of the comparator is 2.4V, which is less than 3.0V; therefore the connections between the input connectors and the output connectors stay off. Hence, the improper phase relation of 60 degrees is treated as a no input condition. Therefore, the following condition chart applies to the circuit of FIG. 2:

| Supply Voltage Condition | Phasing source 1 | source 2 | Result | Output Voltage | Light State |
|---|---|---|---|---|---|
| normal 240 V | 0 deg | 180 deg | Turn-on | 240 V | On |
| normal 208 V | 0 deg | 120 deg | Turn-on | 208 V | On |
| normal 120 V | 0 deg | 0 deg | Stay off | na | Off |
| 1 plug disconnected | any | any | Stay off | na | Off |
| 1 phase reversed 120 V | 0 deg | 180 deg | Turn-on | 0 V | Off |
| 1 phase reversed 240 V | 0 deg | 0 deg | Stay off | na | Off |
| 1 phase reversed 208 V | 0 deg | 60 deg | Stay off | na | Off |
| Voltage under 90 V | any | any | Cycle | <180 V | On/Off |
|  |  |  | Turn-on* | <90 V | Off |
|  |  |  | Turn-on | <180 V | On |
| Temperature above 100 C. | any | any | Cycle | na | On/Off |
| Load over 30A | any | any | Cycle | na | On/Off |

*only 1-phase will be connected

Figure 3:
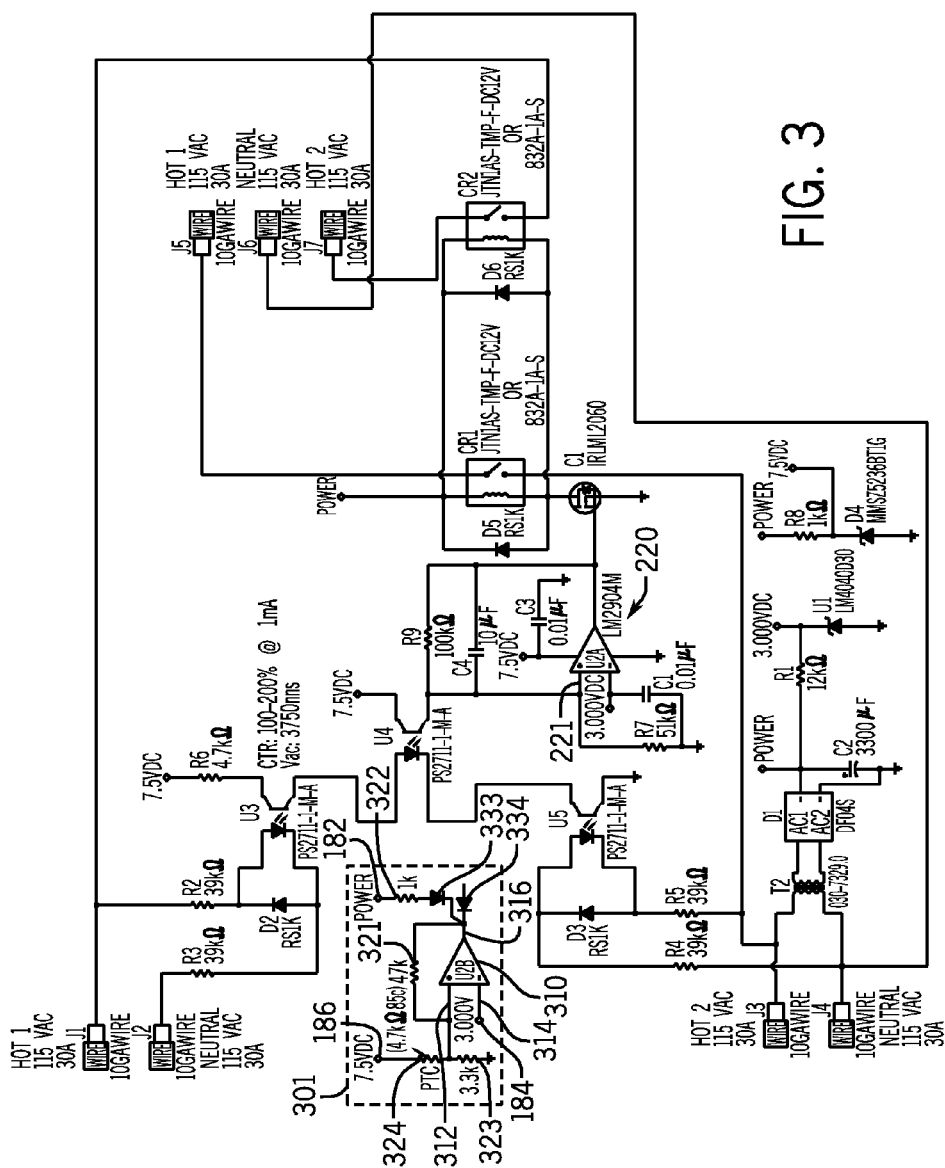
FIG. 3 is a diagram showing another embodiment of a Y-adapter that is configured to supply an electrical power from a pair of power sources to a single receptacle, in accordance with the present invention.

FIG. 3 is a diagram showing another embodiment of the Y-adapter that is configured to safely supply an electrical power from a pair of power sources, in accordance with the present invention. The overall structure, functions and operations of the Y-adapter 30 in FIG. 3 are essentially the same as those in FIG. 1, and a description thereof of similar components and function will be omitted. Further, additional features of the Y-adapter 30 can also be applied to the second embodiment Y-adapter 20 of the present invention.

The difference between the Y-adapter 30 shown in FIG. 3 and the Y-adapter 10 shown in FIG. 1 lies in the Y-adapter 30 has an overtemperature sensing unit 301.

The overtemperature sensing unit 301 includes a second comparator 310, an overcurrent protector 324, such as a PTC thermistor, a resistor 321, a resistor 322, a resistor 323, an overtemperature indicator 333, such as a light emitting diode, and a reverse current connecting device 334, such as a diode.

As shown in FIG. 3, a non-inverting input terminal 312 of the second comparator 310 is connected to an output terminal 316 through the resistor 321. The overcurrent protector 324 is connected between the second voltage output 186 and the non-inverting input terminal 312. The non-inverting input terminal 312 is connected to the ground 109 through the resistor 323. An inverting input terminal 314 of the second comparator 310 is connected to the first voltage output 184. The overtemperature indicator 333 has a cathode terminal connected to the output terminal 316 of the second comparator 310 and an anode terminal connected to the power supply terminal 182 through the resistor 322. The reverse current connecting device 334 has a cathode terminal connected to the output terminal 316 and an anode terminal connected to the non-inverting input terminal 221 of the comparator 220.

The overcurrent protector 324 can protect the circuit by changing from a low-resistance to a high-resistance state in response to an overtemperature caused by an overcurrent. The overcurrent protector 324 in FIG. 3 can work with the amplifier 220 and the diode 334 to provide a low voltage at the non-inverting input terminal 221 of the comparator 220 when the temperature is above a threshold, such as to cut down the connections between the input connectors and the output connector. More particularly, when the temperature is lower than the temperature threshold, the overcurrent protector 324 has a relatively low resistance value. In this situation, the non-inverting input terminal 312 gets a relatively high voltage which results in a high voltage state at the output terminal 316 of the second comparator 310. Therefore there would not be any current to go through the overtemperature indicator 333. When the temperature goes up to the temperature threshold and the resistance value of the overcurrent protector 324 is high enough to make the voltage of the non-inverting input terminal 312 lower than the inverting input terminal 314, the output terminal 316 is at a low voltage state. In this situation, there will be a current driven by the power supply terminal 182 that goes through the overtemperature indicator 333 and turn on the light of the indicator 333. Further, diode 334 is turned on and the non-inverting input terminal 221 of the comparator 220 is connected to the output terminal 316 of the second comparator 310, which results in the non-inverting input terminal 221 being connected to a low voltage state. Therefore the voltage of the non-inverting input terminal 221 is reduced significantly and the connection between the input connectors and the output connectors is opened.

Figure 4:
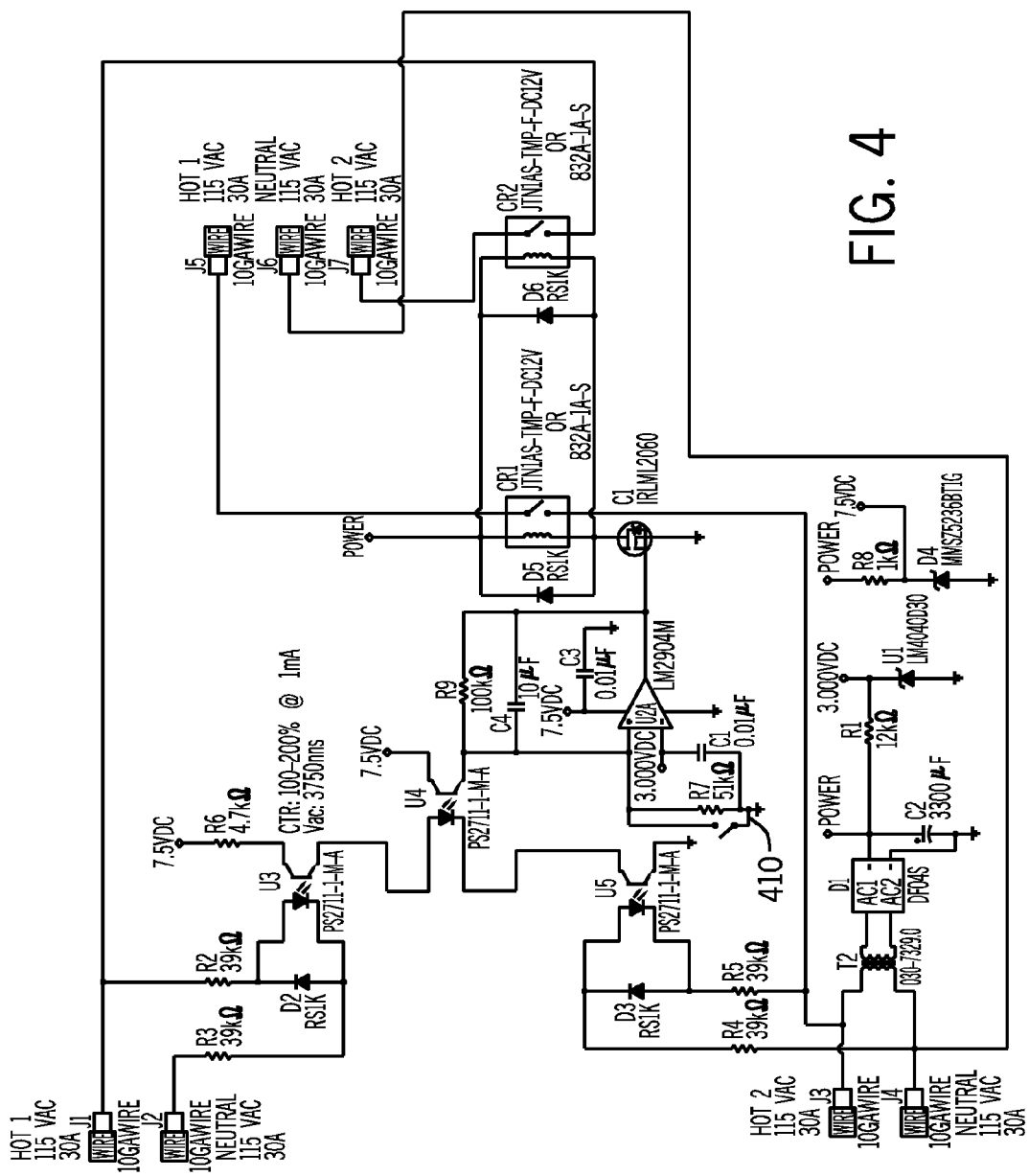
FIG. 4 is a diagram showing another embodiment of a Y-adapter that is configured to supply electrical power from a pair of power sources to a single receptacle, in accordance with the present invention.

FIG. 4 is a diagram showing another embodiment of the Y-adapter 40 that is configured to safely supply an electrical power from a pair of power sources, in accordance with the present invention. The overall structure, functions and operations of the Y-adapter 40 in FIG. 4 are essentially the same as those in FIG. 1, and a description thereof of similar components and function will be omitted. Further, additional features of the Y-adapter 40 can also be applied to the second embodiment Y-adapter 20 of the present invention.

As shown in FIG. 4, a thermal switch 410 can also be used as a substitute of the overtemperature sensing unit 301 in FIG. 3. The thermal switch 410 can be parallel connected to the seventh resistor 197. When the temperature is above a threshold, the switch 410 will be closed, and therefore the non-inverting input terminal 221 of the comparator 220 is connected to the ground 109. Hence the connection between the input connectors and the output connectors is opened.

Figure 5:
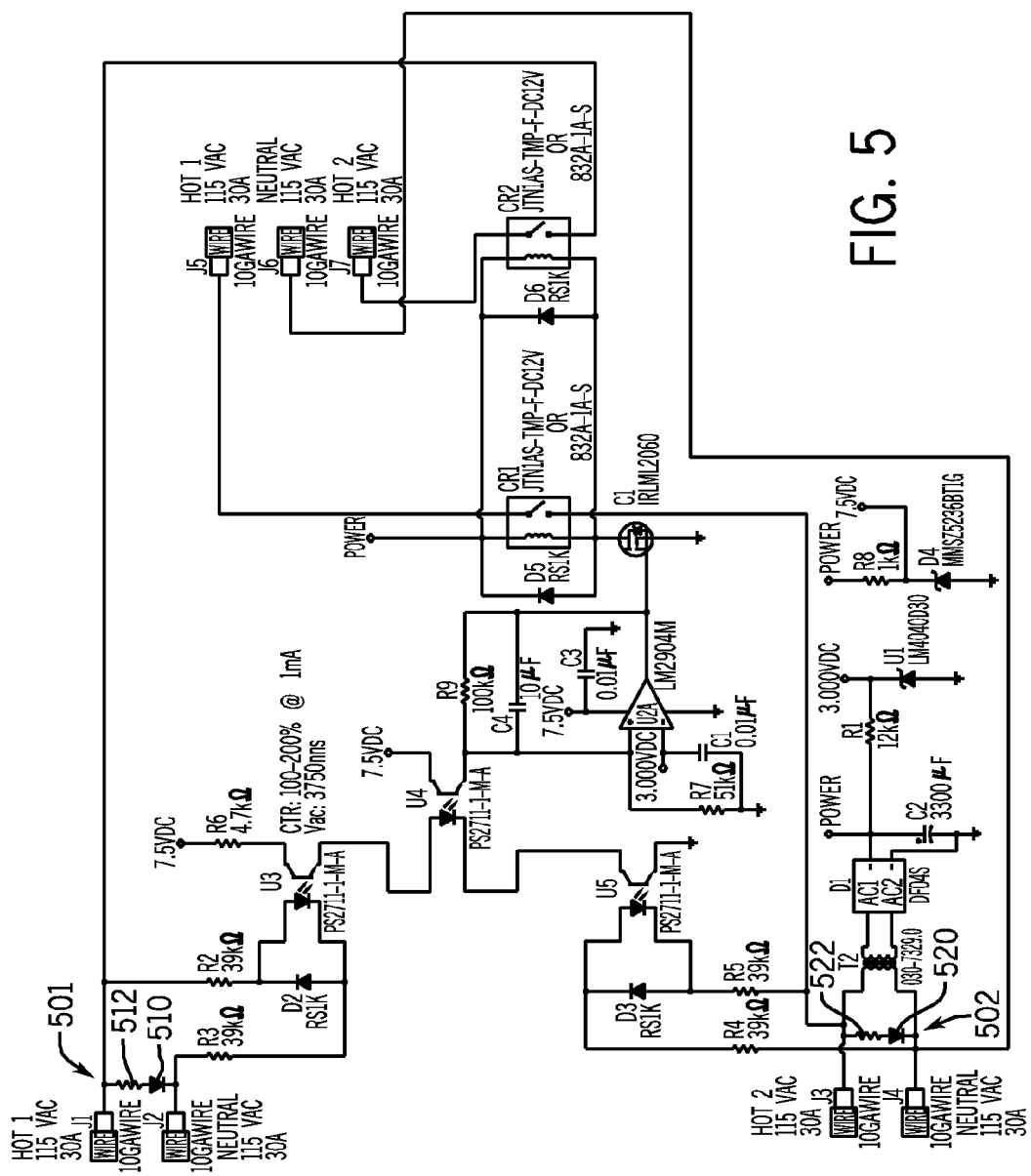
FIG. 5 is a diagram showing another embodiment of a Y-adapter that is configured to supply electrical power from a pair of power sources to a single receptacle, in accordance with the present invention.

FIG. 5 is a diagram showing another embodiment of the Y-adapter 50 that is configured to safely supply an electrical power from a pair of power sources, in accordance with the present invention. The overall structure, functions and operations of the Y-adapter 50 in FIG. 5 are essentially the same as those in FIG. 1, and a description thereof of similar components and function will be omitted. Further, additional features of the Y-adapter 50 can also be applied to the second embodiment Y-adapter 20 of the present invention.

As shown in FIG. 5, the Y-adapter 50 includes a phase presence indication unit 501 and 502 for the first connector 101 and the second connector 102 respectively. The phase presence indication unit 501 includes a LED 510 and a resistor 512 in series connected between the hot wire terminal 112 and the neutral terminal 114 of the first connector 101. Similarly, the phase presence indication unit 502 includes a LED 520 and a resistor 522 in series connected between the hot wire terminal 122 and the neutral terminal 114 of the second connector 102.

In FIG. 5, the LED 510 and LED 520 on each of the two input connectors can aid phase troubleshooting by indicating that one or both phases are energized. If both lights are on and no output occurs, then phase relations are improper. If one or both do not light, then that input is absent. If all LEDs light, the conditions are correct and the relays are on.

Detailed description is provided above for a power adapter provided by the present invention. Embodiments are used herein to describe the principles and modes of carrying out the present invention, the above description of embodiments is only to help understand the methods and core thinking of the present invention; at the same time, those skilled in the art may modify modes of carrying out and application scope of the present invention according to the spirit thereof. In summary, the contents of the specification may not be construed as restrictive to the present invention.

What is claimed is:

1. A power Y-adapter for providing AC power at a high voltage to an output end of the Y-adapter from at least two input ends of the Y-adapter, to each of which input ends AC power of a lower voltage is provided with a phase difference between the AC power provided to the two input ends, comprising:

a first polarity sensitive current isolation device associated with a first input connector which is adapted to be connected to a first receptacle of a first voltage and phase, the first polarity sensitive current isolation device having a first input terminal and a second input terminal, the first input terminal being connected to a hot wire terminal of the first input connector and the second input terminal being connected to a neutral terminal of the first input connector;

a second polarity sensitive current isolation device associated with a second input connector which is adapted to be connected to a second receptacle of substantially the same voltage as the first receptacle and at a different phase than the first receptacle, the second polarity sensitive current isolation device having a first input terminal and a second input terminal, the first input terminal being connected to a neutral terminal of the second input connector and the second input terminal being connected to a hot wire terminal of the second input connector;

each of the first and the second polarity sensitive current isolation devices having a first output node and second output node in series;

a control section in series with the output nodes of the first and the second polarity sensitive current isolation devices; and an output section having an output connector with a first hot wire terminal and a second hot wire terminal controlled by the control section;

such that voltage signals supplied to the hot wire terminals of the first input connector and the second input connector which are out of phase produce a voltage of higher magnitude between the first and the second hot wire terminals of the output connector;

a power supply unit including a transformer having a first input terminal and a second input terminal connected to the hot wire terminal and the neutral terminal of the first input connector, respectively;

a bridge rectifier having two input terminals connected to two output terminals of the transformer and a positive output terminal and a negative terminal connected to a ground;

a power output connected to the positive output terminal of the bridge rectifier;

a first voltage output connected to the positive output terminal of the bridge rectifier through a first resistor, wherein the first voltage output provides a first voltage; and a second voltage output connected to the positive output terminal of the bridge rectifier through a second resistor, wherein the second voltage output provides a second voltage.

2. The power Y-adapter of claim 1, wherein the first polarity sensitive current isolation device is an optocoupler.

3. The power Y-adapter of claim 1, wherein the second polarity sensitive current isolation device is an optocoupler.

4. The power Y-adapter of claim 1, wherein the first output node of the first polarity sensitive current isolation device is connected to the power output of the power supply unit; and the second output node of the second polarity sensitive current isolation device is connected to the ground.

5. The power Y-adapter of claim 1, wherein the control section in series with the output nodes of the first and the second polarity sensitive current isolation device, includes:

a third polarity sensitive current isolation device including a first input terminal connected to the second output node of the first polarity sensitive current isolation device, a second input terminal connected to the first input terminal of the second polarity sensitive current isolation device, a first output terminal connected to the second voltage output of the power supply unit, and a second output terminal;

a comparison unit including a comparator having a non-inverting input terminal connected to the second output terminal of the third polarity sensitive current isolation device, an inverting input terminal connected to the first voltage output of the power supply unit, a positive power supply terminal connected to the second voltage output of the power supply unit, a negative power supply terminal connected to the ground, and an output terminal;

a transistor having a gate terminal connected to the output terminal of the comparator, a source terminal connected to the ground, and a drain terminal; and an output control unit including a first relay and a second relay having a first terminal, a second terminal, a third terminal, and a fourth terminal, respectively, wherein the first terminal of the first relay and the first terminal of the second relay are connected to the drain terminal of the transistor, the second terminal of the first relay and the second terminal of the second relay are connected to the power output of the power supply unit, the third terminal of the first relay is connected to the first hot wire terminal of the output connector, the third terminal of the second relay is connected to the second hot wire terminal of the output connector, the fourth terminal of the first relay is connected to the hot wire terminal of the first input connector, and the fourth terminal of the second relay is connected to the hot wire terminal of the second input connector.

6. The power Y-adapter of claim 5, wherein the comparison unit further includes an overtemperature sensing unit including a second comparator and a temperature sensitive resistor, which is configured to open the connection between the first input connector, the second input connector and the output connector when the temperature is above a threshold.

7. The power Y-adapter of claim 5, wherein the comparison unit further includes an overtemperature indicator, including an indicator that turns on when the temperature is above a threshold.

8. The power Y-adapter of claim 5 further including at least one phase indicator, each of which is connected between the hot wire terminal and the neutral terminal of the first input connector, or the hot wire terminal and the neutral terminal of the second input connector, or both.

9. The power Y-adapter of claim 5, wherein the comparison unit compares a voltage of the second output terminal of the third isolation device with the first voltage, such that when the phase difference between the hot wire terminal of the first connector and the hot wire terminal of the second connector are insufficient, the output terminal of the comparator is in a low voltage state.

10. The power Y-adapter of claim 1, wherein there is no circuit including a single component bridging the hot wire terminal of the first input connector and the hot wire terminal of the second input connector.

11. The power Y-adapter of claim 1, wherein the voltage at the output section is cycled on and off in the case of a low supply voltage condition.

12. The power Y-adapter of claim 1, wherein the isolation devices are connected to the respective input connectors by pairs of resistors.

* * * * *